United States Patent
Barton et al.

(10) Patent No.: US 9,901,896 B2
(45) Date of Patent: *Feb. 27, 2018

(54) HYDROGEN GENERATORS AND FUEL CELL SYSTEMS WITH SELECTIVE FUEL PELLET HEATING

(71) Applicant: Intelligent Energy Inc., San Jose, CA (US)

(72) Inventors: Russell Barton, New Westminster (CA); Thomas J. Kmetich, Willoughby Hills, OH (US)

(73) Assignee: INTELLIGENT ENERGY INC., San Jose, CA (US)

(*) Notice: Subject to any disclaimer, the term of this patent is extended or adjusted under 35 U.S.C. 154(b) by 117 days.

This patent is subject to a terminal disclaimer.

(21) Appl. No.: 14/645,203

(22) Filed: Mar. 11, 2015

(65) Prior Publication Data

US 2015/0182938 A1 Jul. 2, 2015

Related U.S. Application Data

(63) Continuation of application No. PCT/US2013/054626, filed on Aug. 13, 2013.

(Continued)

(51) Int. Cl.
*B01J 7/00* (2006.01)
*B01J 19/24* (2006.01)
(Continued)

(52) U.S. Cl.
CPC .......... *B01J 19/24* (2013.01); *C01B 3/04* (2013.01); *H01M 8/065* (2013.01); *B01J 2219/00132* (2013.01); *Y02E 60/364* (2013.01)

(58) Field of Classification Search
CPC ...... B01J 7/00; H01M 8/065; H01M 8/04216; H01M 8/0297; C01B 3/0005;
(Continued)

(56) References Cited

U.S. PATENT DOCUMENTS

| 4,463,063 A * | 7/1984 | Adlhart ............. H01M 8/06 429/416 |
| 5,360,461 A | 11/1994 | Meinzer |

(Continued)

OTHER PUBLICATIONS

International Search Report dated Dec. 9, 2013, issued in International patent application PCT/US2013/054626.

*Primary Examiner* — Imran Akram
(74) *Attorney, Agent, or Firm* — Baker & Hostetler LLP (57) ABSTRACT

A hydrogen generator, a fuel cell for use in the hydrogen generator and a fuel cell system are disclosed. The hydrogen generator includes a housing and a plurality of fuel pellets disposed in the housing. Each fuel pellet includes a hydrogen-containing reactant that will react to release hydrogen gas when heated. The hydrogen generator also includes a plurality of heating elements extending into the plurality of fuel pellets to generate heat to selectively heat one or more fuel pellets to initiate a reaction to produce hydrogen gas. The hydrogen generator further includes a plurality of electrical contacts operatively coupled to the plurality of heating elements to selectively supply electrical power to the plurality of heating elements.

15 Claims, 7 Drawing Sheets

Related U.S. Application Data (60) Provisional application No. 61/700,468, filed on Sep. 13, 2012.

(51) Int. Cl.
 *C01B 3/04* (2006.01)
 *H01M 8/065* (2016.01)

(58) Field of Classification Search
 CPC ............. C01B 3/0084; C01B 2203/085; F17C 11/005; Y02E 60/321
 See application file for complete search history.

(56) References Cited

U.S. PATENT DOCUMENTS

| | | | | |
|---|---|---|---|---|
| 8,771,889 B2* | 7/2014 | Langan | ................. | C01B 3/0084 429/426 |
| 9,079,144 B2* | 7/2015 | Barton | ...................... | B01J 7/00 |
| 9,231,264 B2* | 1/2016 | Langan | ................. | C01B 3/0084 |
| 9,391,334 B2* | 7/2016 | Barton | ................... | C01B 3/065 |
| 2002/0073618 A1 | 6/2002 | Ovshinsky et al. | | |
| 2003/0180587 A1* | 9/2003 | Jones | ........................ | B01J 7/00 48/61 |
| 2004/0009121 A1 | 1/2004 | Jensen et al. | | |
| 2004/0023087 A1 | 2/2004 | Redmond | | |
| 2009/0117423 A1* | 5/2009 | Eickhoff | ............. | H01M 4/8605 429/515 |
| 2009/0130512 A1* | 5/2009 | Eshraghi | ............... | H01M 8/004 429/437 |
| 2010/0247425 A1* | 9/2010 | Scattergood | ........... | B01J 8/0496 423/648.1 |
| 2010/0326992 A1* | 12/2010 | De Rango | ............. | C01B 3/0005 220/581 |
| 2011/0033342 A1* | 2/2011 | Horiguchi | ................ | C01B 3/02 422/105 |
| 2012/0061397 A1* | 3/2012 | Fruchart | ............... | C01B 3/0005 220/560.04 |
| 2013/0115536 A1* | 5/2013 | Barton | ...................... | B01J 7/00 429/423 |

* cited by examiner

HYDROGEN GENERATORS AND FUEL CELL SYSTEMS WITH SELECTIVE FUEL PELLET HEATING

CROSS-REFERENCE TO RELATED APPLICATIONS

This patent application is a Continuation of international patent application PCT/US2013/054626 filed Aug. 13, 2013, which claims priority to Provisional patent application 61/700,468 filed Sep. 13, 2012, the disclosures of which are incorporated within by reference in their entirety.

FIELD OF THE INVENTION

The present invention generally relates to a hydrogen gas generator, and more particularly relates to a hydrogen generator for providing hydrogen gas to a fuel cell system.

BACKGROUND OF THE INVENTION

Interest in fuel cell batteries as power sources for portable electronic devices has grown. A fuel cell is an electrochemical cell that uses materials from outside the cell as the active materials for the positive and negative electrodes. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the positive electrode side of the fuel cell, and hydrogen is produced from the supplied fuel. In other types of hydrogen fuel cells, hydrogen gas is supplied to the fuel cell from a source outside the fuel cell. A fuel cell system can include a fuel cell battery, including one or more fuel cells (such as a fuel cell stack), and a hydrogen source, such as a fuel tank, a hydrogen tank or a hydrogen gas generator. Gas generators that supply gas to a fuel cell can be an integral part of the fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

A hydrogen gas generator uses one or more reactants containing hydrogen that can react to produce hydrogen gas. Hydrogen generators can produce hydrogen using a variety of reactants and a variety of methods for initiating the hydrogen generating reactants. The reaction can be initiated in various ways, such as hydrolysis and thermolysis. For example, two reactants can produce hydrogen and byproducts. Examples of hydrogen-containing materials include liquid or gaseous hydrocarbons (such as methanol), hydrides (such as metal hydrides and chemical hydrides), alkali metal silicides, metal/silica gels, water, alcohols, dilute acids, and organic fuels (such as N-ethylcarbazon and perhydrofluorene). A hydrogen-containing compound can react with another reactant to produce hydrogen gas when the reactants are mixed together, in the presence of a catalyst, heat or an acid, or a combination thereof. A hydrogen-containing compound can be heated to evolve hydrogen in a thermochemical decomposition reaction.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

In order to provide hydrogen over a long period of time without developing a very high pressure within the hydrogen generator, it is desirable to generate the hydrogen on an as-needed basis. This requires controlling the reaction of the reactant(s), such as by reacting only a limited quantity at a time.

It is desirable to provide a hydrogen generator capable of supplying hydrogen gas to a fuel cell stack that has one or more of the following features: capable providing a large total volume of hydrogen gas per unit of mass and per unit of volume of the hydrogen generator, capable of controlling the reaction of the reactant(s) to efficiently provide hydrogen on an as-needed basis without producing an excessive internal pressure within the hydrogen generator, able to operate at or below a desired maximum temperature, all or a portion of the hydrogen generator in a fuel cell system can be replaced after reactants have been consumed, long-term durability and reliability and easy and economic manufacturing.

SUMMARY OF THE INVENTION

According to one aspect of the present invention, a hydrogen gas generator is provided. The hydrogen gas generator includes a housing and a plurality of fuel pellets disposed in the housing, each fuel pellet including a hydrogen-containing reactant that will react to release hydrogen gas when heated. The hydrogen gas generator also includes a plurality of heating elements extending into the plurality of fuel pellets to generate heat to selectively heat one or more fuel pellets to initiate a reaction to produce hydrogen gas. The hydrogen generator further includes a plurality of electrically conductive connectors operatively coupled to the plurality of heating elements to selectively supply electrical power to the plurality of heating elements.

Embodiments can include one or more of the following features:

each of the plurality of heating elements includes a heat generating rod extending through a fuel pellet and coupled at a first end to a first electrically conductive connector on a first side of the pellet and coupled at a second end to a second electrically conductive connector on a second side of the pellet for generating heat when electrical current is conducted on the rod;

the heat generating rod extends entirely through the fuel pellet from the first side to the second side, wherein the first side is opposite the second side;

the plurality of connectors includes a first array of electrical conducting strips coupled to the first ends of the rods on the first side of the fuel pellets and a second array of electrical conducting strips coupled to the second ends of the rods on the second side of the fuel pellets, wherein electrical current is controlled to transmit through selected fuel pellets by selecting one or more of each of the first and second arrays of electrical conducting strips;

each of the first and second arrays of electrical conducting strips includes a friction connector for engaging an end of the heater element;

the heating elements are coupled to the electrically conductive connectors on the same side;

the hydrogen generator includes a circuit board having circuitry coupled to the electrically conductive connectors, wherein the fuel pellets are mounted onto the circuit board via the electrical contacts;

the fuel pellet has a prismatic shape;

the fuel pellet has a pyramid shape;

each heating element includes a carbon rod;

a space is provided between adjacent fuel pellets;

a thermal insulation material is disposed in the space between adjacent fuel pellets;

the hydrogen generator has a hydrogen outlet coupled to the housing in fluid communication with each of the fuel pellets to provide a hydrogen outlet path;

the hydrogen generator includes a controller for controlling activation of each of the plurality of heating elements to selectively heat one or more of the fuel pellets at a time; and the hydrogen generator is adapted to be coupled to a fuel cell to supply hydrogen to the fuel cell.

According to another aspect of the present invention, a fuel pellet for a hydrogen generator is provided. The fuel pellet includes a solid including a hydrogen-containing reactant that reacts to release hydrogen gas when heated. The fuel pellet also includes a heating element extending into the solid and having a first electrical terminal at a first end and a second electrical terminal at an opposite second end, wherein the first and second electrical terminals allow electrical current to conduct on the heating element to generate heat within the solid to release hydrogen gas.

Embodiments can include one or more of the following features:

the heating element includes a heat generating rod extending through the pellet and coupled at a first end to the first electrical terminal on a first side of the fuel pellet and coupled at a second end to the second electrical terminal on a second side of the fuel pellet;

the heat generating rod extends entirely through the solid from the first side to the second side, and wherein the first side is opposite the second side;

the heating element is coupled to the first and second electrical terminals on the same side of solid;

the pellet has a prismatic shape;

the pellet has a pyramid shape; and the heating element comprises a carbon rod.

According to a further aspect of the present invention, a fuel cell system is provided. The fuel cell system includes a hydrogen gas input and a hydrogen generator. The hydrogen generator includes a housing and a plurality of fuel pellets disposed in the housing, each fuel pellet including a hydrogen-containing reactant that will react to release hydrogen gas when heated. The hydrogen generator also includes a plurality of heating elements extending into the plurality of fuel pellets to generate heat to selectively heat one or more fuel pellets to initiate a reaction to produce hydrogen gas. The hydrogen generator further includes a plurality of electrically conductive connectors operatively coupled to the plurality of heating elements to selectively supply electrical power to the plurality of heating elements. The hydrogen generator also includes a hydrogen outlet coupled to the housing to provide a hydrogen outlet path to the hydrogen gas input of the fuel cell.

These and other advantages of the invention will be further understood and appreciated by those skilled in the art by reference to the following written specification, claims, and appended drawings.

DETAILED DESCRIPTION OF THE PREFERRED EMBODIMENTS

A hydrogen generator that produces hydrogen gas, a fuel pellet used in the hydrogen generator and a fuel cell system that employs the hydrogen generator are disclosed. The hydrogen gas generated by the hydrogen generator can be used by a hydrogen consuming system, such as the fuel cell system including a fuel cell stack that produces electricity for an electronic device. The hydrogen generator includes a housing also described herein as a cartridge that is configured to be removably inserted into a compartment in a fuel cell system or other device. The cartridge may be a replaceable cartridge that may be removably inserted within the compartment. The hydrogen generator can be re-used at a minimum added expense by replacing the cartridge in which the reactants are contained. The cartridge can be disposed of after use, can be re-used by refilling it with fresh reactants, or the cartridge or a portion of it can be recycled.

The size and shape of the cartridge and the compartment can be varied depending on the circumstances. For example, the cartridge can have a prismatic shape, such as a generally rectangular shape, pyramidal or any other shape. The cartridge has outer walls arranged to form a housing shown in the generally rectangular shape. Included as the housing walls are top, bottom and four lateral side walls. The housing may be assembled with bottom and top housing members which are matingly assembled together to form a closed gas containing housing. A seal may be disposed between the top and bottom housing members to provide a gas tight seal.

The hydrogen generator includes a plurality of fuel pellets disposed in the cartridge housing. Each fuel pellet includes a hydrogen-containing reactant that will react to release hydrogen gas when heated. Each fuel pellet has a solid composition formed in a prismatic shape, such as generally rectangular shape according to one embodiment or a pyramidal shape according to another embodiment. The fuel pellets may have other shapes and sizes. The fuel pellets may be arranged in an array of rows and columns and are spaced apart to provide thermal isolation from one another. A thermal insulation material may be disposed in the space between adjacent fuel pellets to further thermally insulate the fuel pellets from one another. As such, individual fuel pellets may be heated to generate hydrogen, while thermally isolating the fuel pellet from adjacent fuel pellets so that unintended initiation of a reaction in one pellet as a result of heat transfer from an adjacent pellet is prevented.

The hydrogen generator also includes a plurality of heating elements extending into the plurality of fuel pellets to generate heat to selectively heat one or more fuel pellets to initiate a reaction to produce hydrogen gas. Each fuel pellet has a corresponding heating element extending into the solid composition. The heating element may include a heat generating rod extending through the solid and exposed at a first end on a first side of the fuel pellet and exposed at a second end on a second side of the fuel pellet. The first end is coupled to a first electrically conductive connector and the second end is coupled to a second electrically conductive connector. The first and second electrically conductive connectors supply electrical current to and from the heating element such that electrical current is transmitted or conducted across the heating element to generate heat. In one embodiment, the heat generating rod extends entirely through the fuel pellet such that it is exposed on opposite first and second sides. Heat generated by each heating element heats the hydrogen-containing reactant such that it reacts to release hydrogen gas.

The hydrogen generator includes an array of electrically conductive connectors operatively coupled to the plurality of heating elements to selectively supply electrical power to the plurality of heating elements. The electrically conductive connectors include a first array of electrical conducting strips coupled to the first ends of the heating elements (e.g., rods) on the first side and a second array of electrical conducting strips coupled to the second ends of the heating elements on the second side. Electrical current is selectively controlled to transmit through the heating elements in select fuel pellets by selecting one or more of each of the first and second arrays of electrical conducting strips. The first and second electrical conducting strips include physical connectors which can include barbs which frictionally hold the plurality of fuel pellets and heater elements together in an assembly that may be easily inserted into and removed from the housing. The first and second arrays of electrical connecting strips may extend orthogonal to one another to provide an array of rows and columns. In one embodiment, eight conducting strips are provided to connect to the top end of eight rows of heating elements and eight conducting strips are provided to connect to the bottom end of eight columns of heating elements. One of the top and bottom conducting strips is coupled to an electrical power supply and the other of the top and bottom conducting strips is coupled to ground. By selecting one top conducting strip and one bottom conducting strip, the one heating element connected to both selected conducting strips is energized so that current is transmit across the heating elements to heat the corresponding fuel pellet. A control system may select one fuel pellet to heat at a time by selecting the corresponding row and column of electrically conductive connectors. The heating elements may be selectively activated to heat one or more fuel pellets at a time or a desired selection process may be employed to generate the necessary amount of hydrogen and to control the temperature and heat distribution within the housing. While an eight-by-eight array of fuel pellets is shown and described herein, it should be appreciated that one or more fuel pellets may be employed.

According to another embodiment, the heating elements may include a curved or bent element that extends into the fuel pellet and has first and second electrical terminals extending from the same side or from different sides (such as opposite sides) of the pellet. In this embodiment, the first and second terminals may act as electrically conductive connectors for holding the fuel pellet in place and connecting the fuel pellet onto a circuit board or other substrate. As such, electrical current applied to the first and second terminals allows current to be conducted through the heating element to heat the corresponding fuel pellet. It should be appreciated that various size and shape heating elements may be employed such as helical and other configurations within the solid composition of the fuel pellet.

The cartridge housing also includes an outlet in the housing and a hydrogen flow path from each fuel pellet to a hydrogen outlet path. The outlet may include a valve that is operatively coupled to a hydrogen consuming device, such as a fuel cell stack. The hydrogen generator may be used in a fuel cell system to supply generated hydrogen on an as needed basis to a fuel cell or may be used in other hydrogen consuming devices.

One or more reactants are contained in a solid composition that is formed into a fuel pellet. The solid composition may be formed into a solid body surrounding the heating element such that the heating element extends within the solid composition. The formation of the fuel pellet may include a simple process, such as molding, extruding, depositing, coating, printing, and so on. In one embodiment, the fuel pellet is formed into a prismatic shape such as a rectangular shape, so that multiple fuel pellets may be arranged side-by-side in a volume efficient manner. Multiple layers of stacked fuel pellets may be provided. The size of the fuel pellets, including the height, the width, and length, can be chosen to provide a desired quantity of hydrogen, based on the size of the fuel cell stack and the power requirements of the electronic device, as well as the volume available in the hydrogen generator.

The solid bodies containing the reactant can be in various forms, such as tablets, wafers, cakes, briquettes, coatings, and so on, all referred to herein as fuel pellets. Reactants and optional components of the solid composition are described below. The solid bodies can have various shapes, such as rectangles, circles, ovals, squares, triangles, trapezoids, wedges, irregular shapes, and so on. The solid bodies can be made using a suitable process, such as molding, extruding, depositing, briquetting, coating, printing, and so on. As used below, the term "pellet" refers to a solid body of the reactant, and is not limited to a particular form, shape, or method of manufacture, unless otherwise stated. The pellets can be sized and shaped to fit into the cartridge housing in a volume-efficient manner. The pellet size and composition can be chosen to provide a desired quantity of hydrogen from each pellet, based on the size of the fuel cell stack and the power requirements of the electronic device, for example.

The reactant in the fuel pellets contains elemental hydrogen that is released as hydrogen gas when the fuel pellet is heated sufficiently by way of the heating elements. The hydrogen gas produced by this reaction travels through a hydrogen flow path from the reactant to a hydrogen outlet in the housing. The hydrogen outlet can include a valve to control the hydrogen flow.

At least one hydrogen-containing reactant is included in each fuel pellet. More than one reactant can be included. Examples of reactants that can evolve hydrogen gas upon thermal decomposition include: lithium idide ($Li_2NH$), lithium amide ($LiNH_2$), an ammonium halide (e.g., $NH_4F$, $NH_4Cl$ or $N_2H_6Cl_2$) plus a chemical hydride (e.g., $LiH$, $LiBH_4$, $NaBH_4$, $LiAlH_4$ or $NaAlH_4$), alane ($AlH_3$), ammonia borane ($NH_3BH_3$), ammonia borane plus a chemical hydride (e.g., alane or a boron hydrazine complex such as hydrazine bisborane ($N_2H_4(BH_3)_2$)), ammonium nitrate ($NH_4NO_3$) plus diammonium decaborane ($B_{10}H_{10}(NH_4)_2$), sodium boronydride, alanates, e.g., sodium alanate ($NaAlH_4$) and other materials, such as grapheme and carbon nanotubes with hydrogen inserted therein.

The hydrogen-containing reactant can also contain one or more additives. Examples of additives include binders (e.g., acrylates and styrene block copolymers), stabilizing compounds (e.g., solid bases), reaction accelerators (e.g., solid acids), catalysts (e.g., $Fe_2O_3$, $TiCl_3$), ignition materials as described below, thermally conductive materials (e.g., metals, graphites and combinations and composites thereof), and so on. Rubber cement may be added to the reactant as a binder (e.g., 50%) to hold the reactant together as the feed member flexes.

The heating elements heat the reactant to result in a thermal decomposition reaction of the hydrogen-containing reactant to release hydrogen. Multiple heating elements can advantageously be activated simultaneously to heat multiple pellets at one time, when more hydrogen is required. The heating element may include a rod shaped heater made of carbon, according to one embodiment. The carbon rod may extend entirely through the fuel pellet and have first and second end caps extending outward from opposite sides of the fuel pellet. According to another embodiment, the heating element may have a curved portion and electrical contacts that extend from the same side of the fuel pellet. Various types of electrical powered heating elements can be used. Examples of heating elements include resistive heaters, inductive heaters, infrared heaters, laser heaters, microwave heaters, semi-conductive bridges, and so on. Examples of suitable types of heating elements include resistive heating elements. Resistive heating elements can be a rod, a wire, a ribbon, or a strip. Suitable materials include metals and alloys (e.g., nickel-chromium alloys, iron-chromium-aluminum alloys, copper-nickel alloys, and other types of alloys), intermetallic compounds (e.g., molybdenum, disilicides), and metal ceramics. The electrical current source for the heating elements can be a battery, fuel cell, or other source of electrical energy within the hydrogen generator, elsewhere in the system, or even outside the system (e.g., within a device being supplied with power from a fuel cell stack in the system).

The heating element can be the sole means of applying heat to the reactant, or an ignition material (a material that will react exothermically, producing heat for the thermal decomposition reaction of the hydrogen-containing reactant) can be included in the fuel pellet, such as in a mixture with the reactant or as a separate layer or portion of the pellet. If the thermal decomposition reaction of the reactant generates heat, it may be possible to reduce or stop applying heat after the reaction is initiated. An ignition material can be used to supplement or replace the application of more heat by the heating elements, thereby reducing the amount of energy consumed by the hydrogen generator. Examples of ignition materials (some of which can also contribute to the hydrogen yield) include iron powder or $TiH_2$ plus $KClO_4$, $MnO_2$ plus $LiAlH_4$, Ni plus Al, Zr plus $PbCrO_4$, $Fe_2O_3$ plus Al (thermite), and $LiAlH_4$ plus $NH_4Cl$.

The fuel pellets can be arranged within the cartridge housing in a variety of ways. For example, the plurality of fuel pellets can be arranged in a single layer or in multiple layers with each layer containing one or more than one fuel pellet. Factors such as size and shape of the cartridge, compartment, and hydrogen generator, the volume of hydrogen to be produced by a single cartridge, and simplicity of the heating elements can be considered in selecting a pellet arrangement.

While it may be desirable to react more than one fuel pellet at a time, in order to prevent the uncontrolled initiation of reactions in adjacent pellets, it is desirable for individual pellets or groups of pellets to be thermally insulated from one another. This can be accomplished in various ways, including spacing pellets apart from each other, separating pellet layers with thermally insulated material (e.g., sheets or layers of thermally insulating material), placing thermal insulation between adjacent pellets or layers of pellets (e.g., containers or coatings made of thermally insulating material), and so on. Suitable thermal insulator materials include silica, silicon dioxide, silicon nitrides, silicon carbide, silica aerogel, alumina, alumina oxide, glass, glass wool, mineral wool, cellular glass, perlite, and polymers, such as polyimides and epoxy-amine composites.

A control system can be used to control the hydrogen generator. Operation of the control system, the heating system or both can be controlled in various ways. The control system can determine the need for hydrogen by monitoring the pressure within the fuel cell system, one or more electrical characteristics of the fuel cell stack, or one or more electrical characteristics of the electronic device, for example. The controller may communicate with the device or the fuel cell stack to determine when more hydrogen is needed. The control system can be completely or partially disposed in the hydrogen generator, the fuel cell stack, the electronic device being powered by the fuel cell stack, or any combination thereof. The control system can include a microprocessor or micro controller; digital, analog and/or hydride circuitry; solid state and/or electromechanical switching devices; capacitors, sensing instrumentation, and so on. The control system can control application of the heating elements to heat selected fuel pellets one or more at a time. The control system may heat fuel pellets remote from one another so as to spread out the heat generation within the cartridge.

The hydrogen flow path can include a channel extending through or around the fuel pellets or pellet layers. The channel can be a central channel, for example. Multiple channels can be present. The hydrogen generator can include various filters and/or purification units to remove undesired reaction byproducts and other contaminants from the hydrogen gas.

The hydrogen generator can also include various fittings, valves and electrical connections for providing hydrogen to and interfacing with the fuel cell stack and/or an electrical appliance being provided with power by the fuel cell system. For example, the hydrogen generator can have external electrical contacts to provide electrical connections between an external electrical current source and the internal electrically conductive connectors and heating elements. The external contacts can be disposed on a single face of the hydrogen generator housing, or they can be on more than one face. The hydrogen generator can include various safety features such as a pressure relief vent to release excessive pressure and a mechanism to stop the energization of the heating elements if the internal temperature exceeds an established limit.

Figure 1:
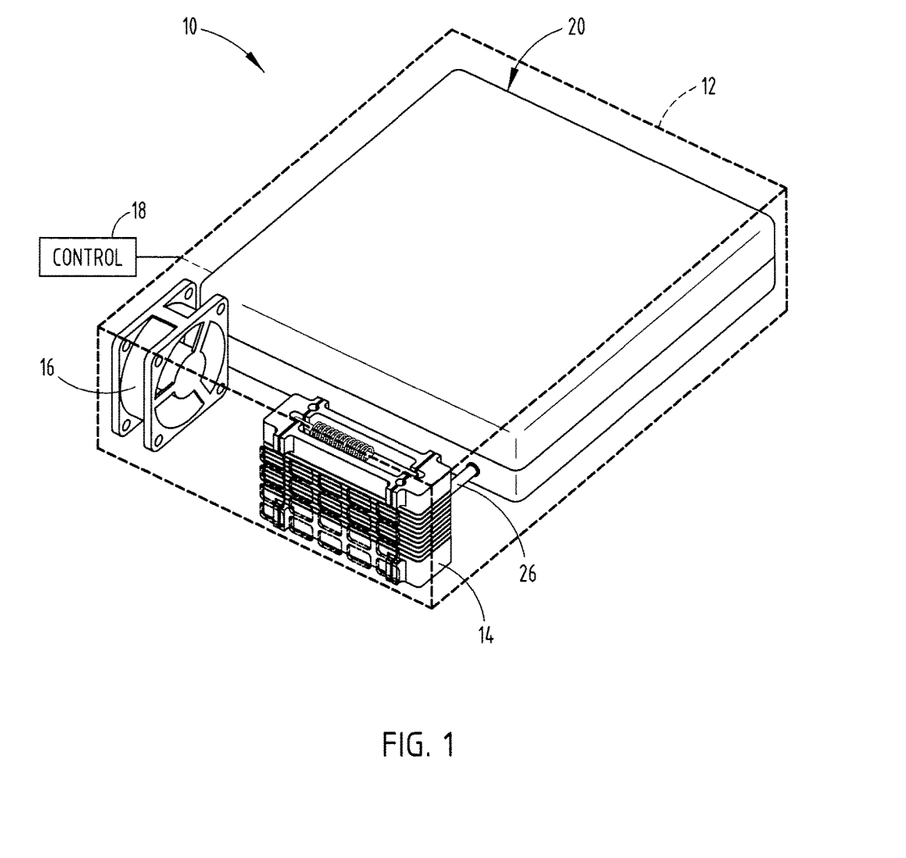
FIG. 1 is a perspective view of a fuel cell system employing a hydrogen generator, according to one embodiment.
Figure 2:
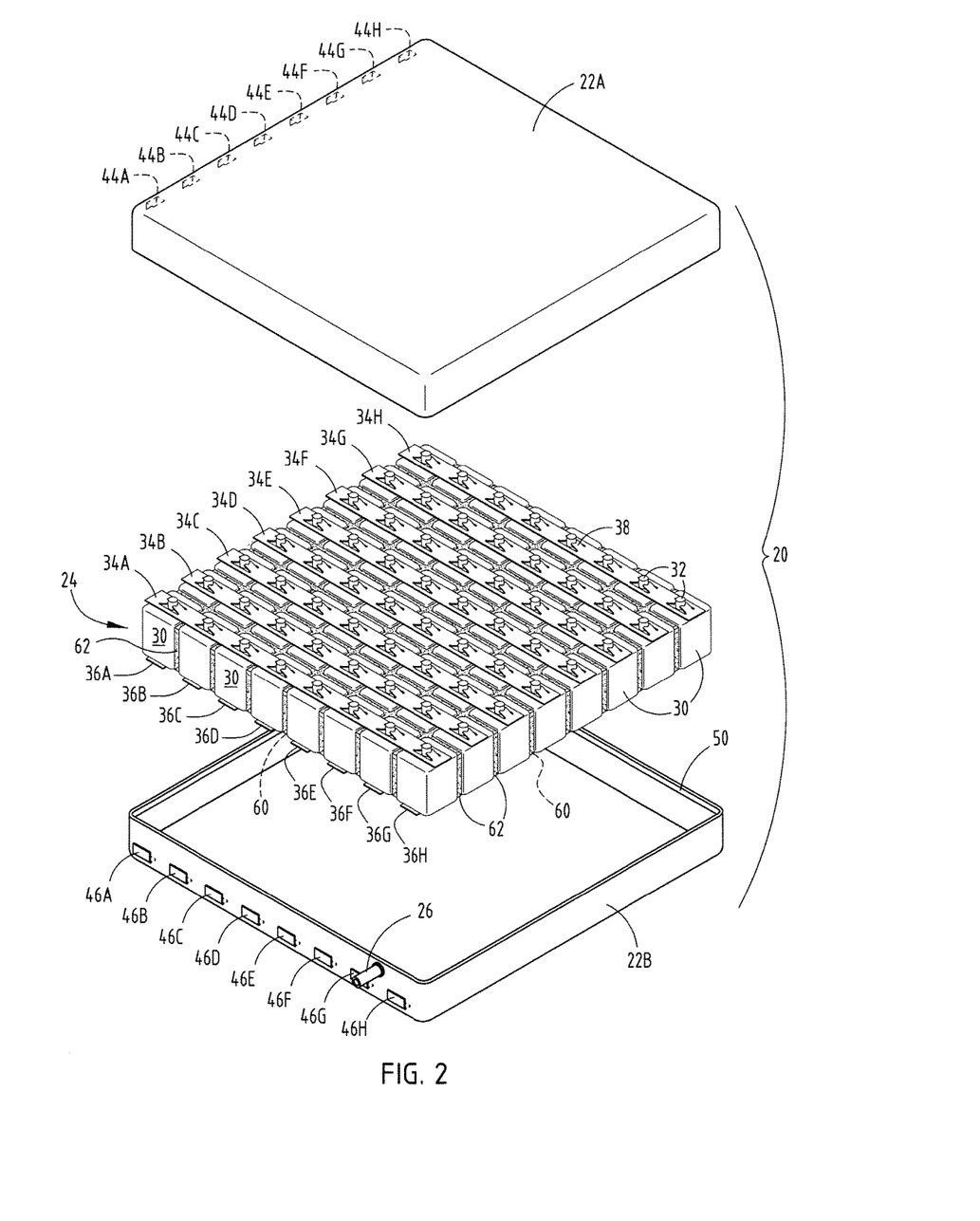
FIG. 2 is an exploded perspective view of the hydrogen generator employing an array of prismatic fuel pellets and heating elements, according to one embodiment.

Referring to FIG. 1, a fuel cell system 10 is generally shown arranged within a fuel cell system housing 12. The fuel cell system housing 12 may include a fuel cell compartment provided in an electrically powered device, such as a computer. The fuel cell system 10 includes a fuel cell 14 also referred to herein as a fuel cell stack. The fuel cell stack 14 has a hydrogen gas input (not shown) to receive and consume hydrogen gas to generate electricity which, in turn, may be supplied to the electrically powered device. The fuel cell stack 14 generally includes a stack of fuel cells each having positive and negative electrodes as is generally known in the fuel cell art. The hydrogen gas may be used as the negative electrode active material and oxygen may be used as the positive electrode active material.

The fuel cell system 10 also includes a hydrogen generator 20 shown and described herein having a housing in the form as a cartridge with a size and shape configured to be received in the fuel cell system housing 12. The hydrogen generator 20 is shown disposed within a fuel cell compartment 12 and may be easily removed therefrom as a replaceable cartridge. The hydrogen generator 20 is shown in FIGS. 2-5 generally having a prismatic shape, shown as a rectangular shape including a housing formed by top housing member 22A and bottom housing member 22B, which are assembled together to define a closed housing. The housing 22A and 22B contains a cartridge assembly 24 including a plurality of fuel pellets 30 for generating and supplying hydrogen gas on an as needed basis to the fuel cell stack 14. The hydrogen gas may be output via hydrogen outlet 26 provided in housing 22A and 22B and any extra fluid coupling path to the fuel cell stack 14. The hydrogen generator 20 may be replaceable, such that a consumed hydrogen generator 20 may be removed from fuel cell housing 12 and a new hydrogen generator 20 installed therein to generate a fresh supply of hydrogen gas for the fuel cell stack 14.

In addition, a controller 18 is illustrated coupled to or included in the fuel cell system 10. The controller 18 may control the hydrogen generator 20 and its generation of hydrogen as desired to meet the needs of the fuel cell stack 14 to provide sufficient electrical power. It should be appreciated that the controller 18 may be located within the fuel cell housing 12 or elsewhere within the fuel cell system 10 or the electrical device employing the fuel cell system 10. It should further be appreciated that the controller 18 could be located within the hydrogen generator 20 or fuel cell stack 14, according to other embodiments. The fuel cell system 10 can also include a cooling fan 16 for cooling the fuel cell stack 14.

FIGS. 2-5 illustrate one embodiment of the hydrogen generator 20. The hydrogen generator 20 includes a housing having a prismatic shape, shown generally as a rectangle having a top housing member 22A assembled to a bottom housing member 22B. The top and bottom housing members 22A and 22B may be assembled and disassembled by way of fasteners (not shown) or other connecting members so as define a closed volume. A seal 50 may further be added between the top and bottom housing members 22A and 22B to further provide a gas tight seal. The housing 22A and 22B forms a cartridge that may be inserted into and removed from the fuel cell system housing 12. While the housing 22A and 22B is shown having a generally rectangular shape, it should be appreciated that other shapes and sizes may be employed as evident to those skilled in the art.

Disposed within the housing 22A and 22B is an assembly 24 of fuel pellets 30, each having a heating element 32 extending through opposite sides of the fuel pellet 30. Each fuel pellet 30 has a generally rectangular shape, according to one embodiment. A top array of electrically conductive connectors 34A-34H is shown connected to the top end of each of the heaters 30 of fuel pellets 30. The bottom end of each of the heating elements 32 is connected to a second array of electrically conductive connectors 36A-36H. The bottom array of electrically conductive connectors is arranged orthogonal to the top array of electrically conductive connectors 34A-34H to define an N×N array of fuel pellets, where N is the number of fuel pellets 30 in each row or column of the array. Provided on the inside of the top housing member 22A are electrical contacts 44A-44H which make electrical contact with each of the respective top conductive connectors 34A-34H. Similarly, provided in the inner surface of the bottom housing member 22B are electrical contacts 46A-46H which make electrical contact with the corresponding bottom conductive connectors 36A-36H. One or more of the top conductive connectors 34A-34H may be supplied with electrical power from contacts 44A-44H, respectively, whereas one or more of the bottom conductive connectors 36A-36H may be coupled to ground via contacts 46A-46H, respectively. As a result, the selected heating element 32 in a particular fuel pellet 30 may be selectively energized by applying power to the top end of the heating element 32 and allowing the current to conduct through the heating element 32 to ground to generate heat. When the heating element 32 generates heat, the heat is transferred to the fuel pellet 30 to initiate a reaction to produce hydrogen gas. It should be appreciated that one or more fuel pellets 30 may be heated at a given time and in a particular sequence as determined by a controller.

Figure 3:
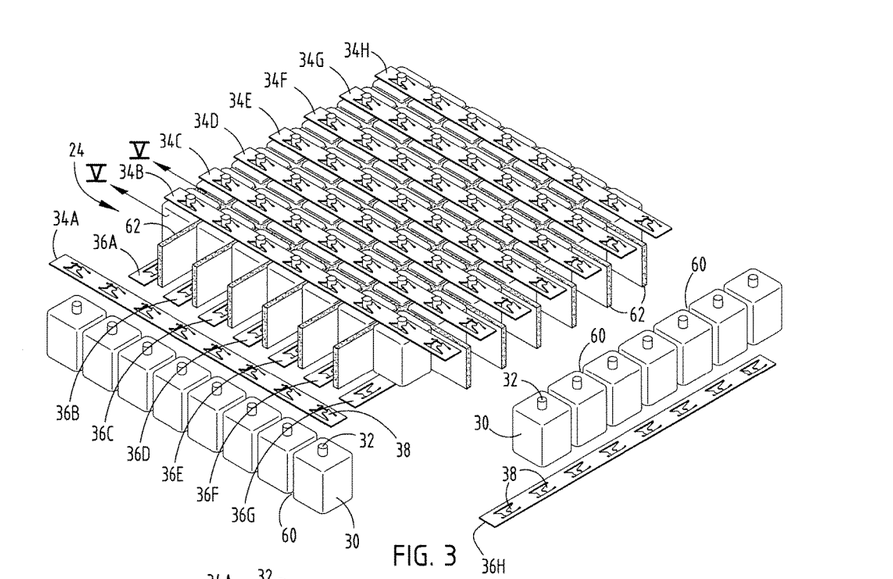
FIG. 3 is a partial exploded view of the assembly of the prismatic fuel pellets and heating elements.
Figure 4:
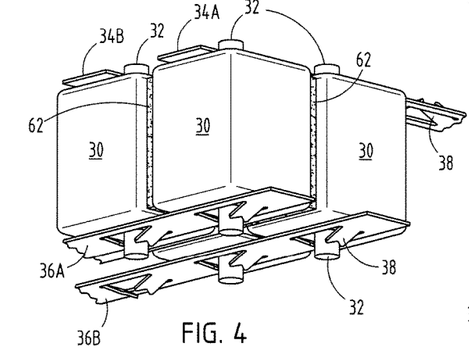
FIG. 4 is a bottom perspective view of a portion of the prismatic fuel pellets and heating elements assembled to electrically conductive connectors.
Figure 5:
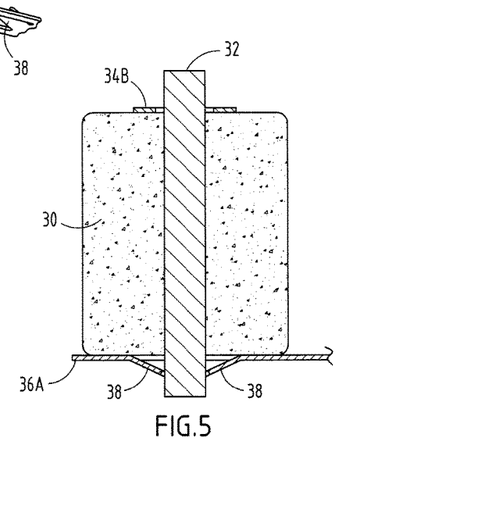
FIG. 5 is an enlarged cross-sectional view taken through line V-V of FIG. 3 further illustrating a prismatic fuel pellet.

With particular reference to FIGS. 3-5, the assembly 24 of the fuel pellets 30, heating elements 32, and top and bottom electrically conductive connectors 34A-34H and 36A-36H are further illustrated. In this embodiment, the heating element 32 is shown extending entirely through the fuel pellet 30 and further extending with terminating cap portions on the top and bottom sides. The fuel pellet 30 contains hydrogen-containing reactant that may be pressed, molded or otherwise formed around the heating element 32. The fuel pellets 30 are arranged in an array side-by-side and are connected to the top and bottom electrically conductive connectors 34A-34H and 36A-36H by frictional connection, according to one embodiment. In one example, the electrical connection may be achieved by use of a Tinnerman styled barb 38 that is pressed onto the end caps of the heater element 32 on the top and bottom ends such that the barb 38 frictionally engages the heater element 32. The barb 38 is angled so as to easily slide onto the end cap of the heater element 32 and to prevent the opposite direction movement at low force. As a result, the assembly 24 of fuel pellets 30 is held together physically and via electrical conductors that supply electrical current. The electrically conductive connectors 34A-34H and 36A-36H may include electrical conducting (e.g., metal) strips that provide physical and electrical coupling to the heater elements 32 in fuel pellets 30.

The heater element 32 is shown in the shape of a straight rod which may have a generally circular cross section. The heater element 32 may include a carbon rod, according to one embodiment. The carbon rod 32 may be a resistive heating element that generates heat when electrical current flows from one end of the carbon rod to the other. It should be appreciated that other types of heating elements may be employed to heat the hydrogen-containing reactant to release hydrogen gas.

Assembly 24 further includes space 60 between each adjacent fuel pellet 30. The space 60 provides thermal isolation between adjacent fuel pellets 30 so as to prevent heat generated within one fuel pellet from reacting other fuel pellets. Additionally, a thermal insulation material 62 such as a fiberglass felt or dehydrated paper may be disposed within the space 60 between the fuel pellets 30 to provide added thermal insulation. Thermal insulation may include other thermal insulation materials.

The space 60 between fuel pellets 30 and space above and below and to the outer sides further provides for a hydrogen flow path for hydrogen to flow from the individual fuel pellets to the hydrogen outlet port 26 formed in housing 22A and 22B. The hydrogen outlet 26 may include a hydrogen outlet valve. The hydrogen outlet 26 is in fluid communication with the hydrogen flow path and may be operatively coupled to a fluid consuming device, such as a fuel cell stack.

Figures 6, 7:
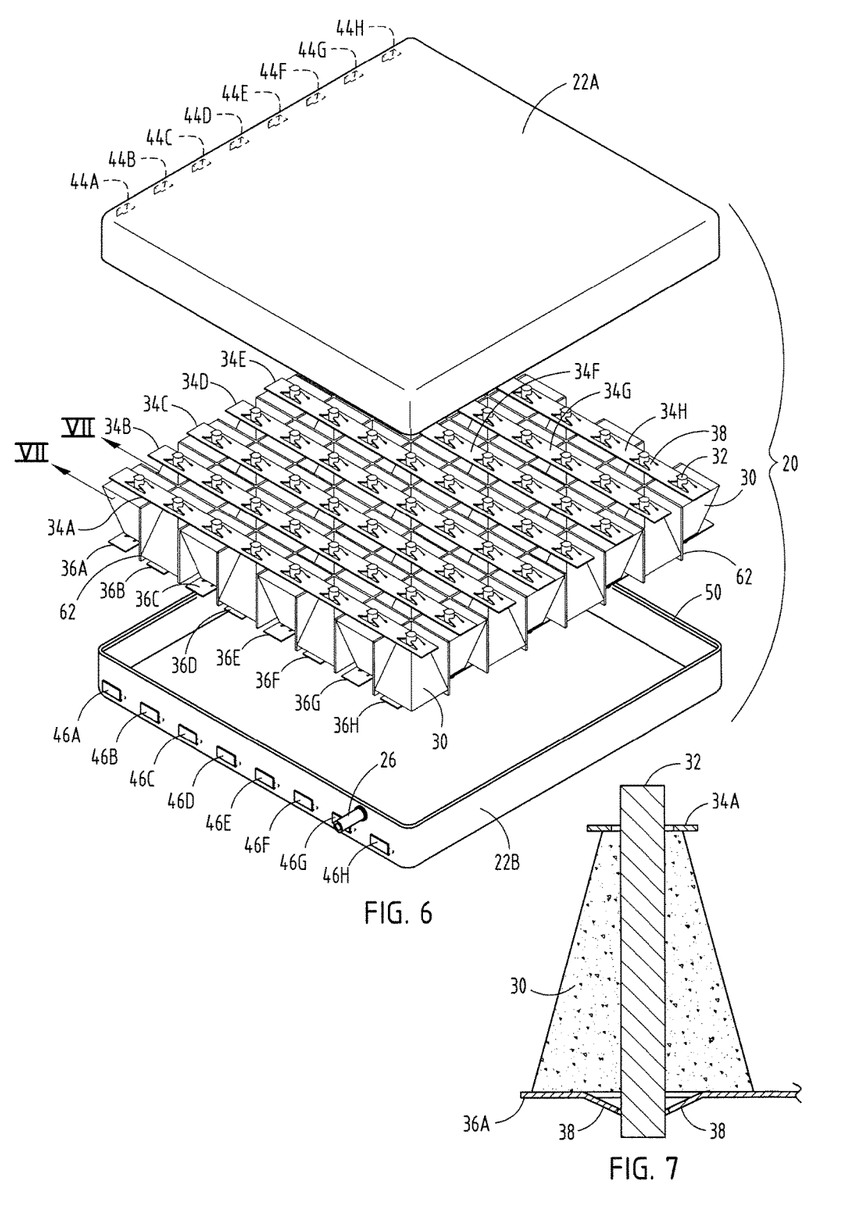
FIG. 6 is an exploded perspective view of a hydrogen generator employing an array of pyramid-shaped fuel pellets, according to another embodiment.
FIG. 7 is an enlarged cross-sectional view taken through line VII-VII of FIG. 6 further illustrating the pyramid-shaped fuel pellet.

Referring to FIGS. 6 and 7, the hydrogen generator 20 is illustrated having the fuel pellets 30 configured in the shape of a general pyramid. In this embodiment, the pyramidal shape fuel pellets 30 alternate in orientation between adjacent fuel pellets, such that one fuel pellet 30 is positioned upright and the adjacent fuel pellets 30 are positioned upside-down relative thereto. Each of the fuel pellets 30 includes a heating element 32 extending entirely through the fuel pellet 30 and extending outward at opposite ends with end cap portions that connect to electrically conductive connectors 34A-34H on the top side and electrically conductive connectors 36A-36H on the bottom side. Each of the heating elements 32 is selectively energized to heat the fuel pellets 30 as described in the connection with the embodiment shown in FIGS. 2-5. By providing alternating orientation of pyramid-shaped fuel pellets 30, a volume efficient assembly 24 may be achieved. It should further be appreciated that a spacing and thermal insulation may further be provided between adjacent fuel pellets 30.

Figure 8:
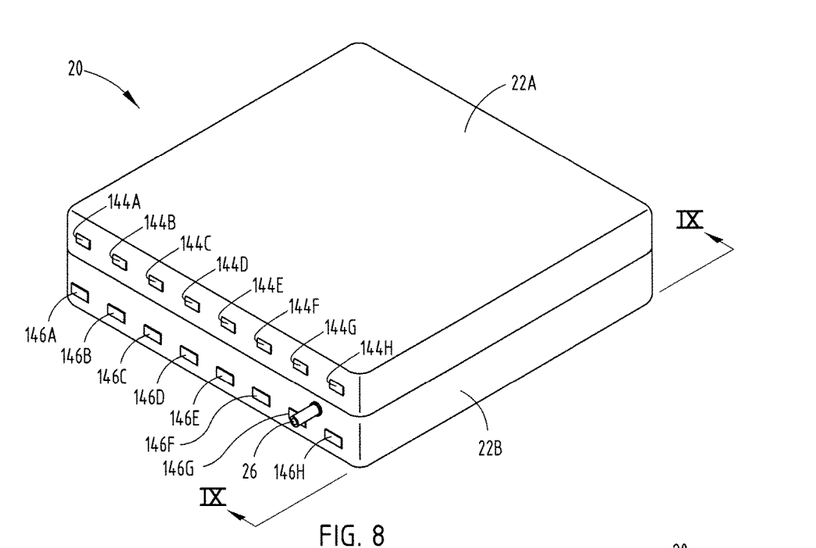
FIG. 8 is a perspective view of a hydrogen generator employing electrical contacts on one side of the housing, according to another embodiment.
Figure 9:
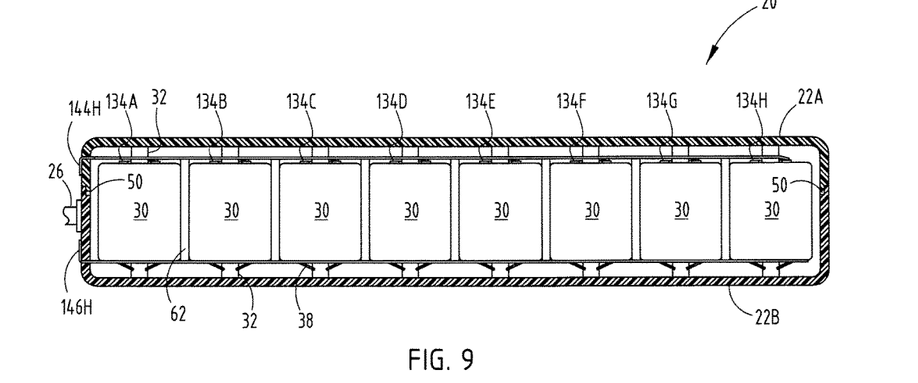
FIG. 9 is a cross-sectional view taken through line IX-IX of FIG. 8 further illustrating the connection of the electrical contacts to the fuel pellets.
Figure 10:
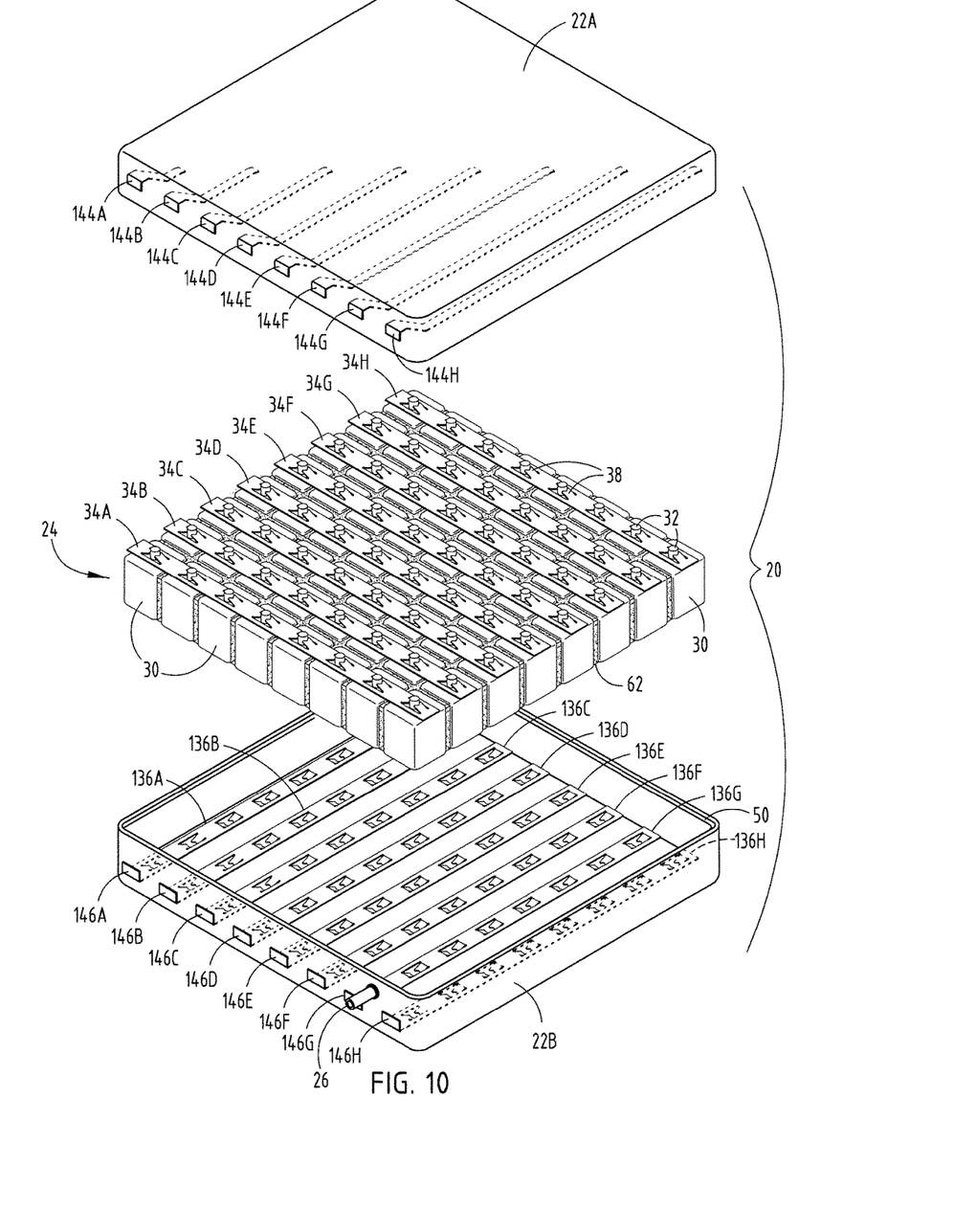
FIG. 10 is an exploded perspective view of the hydrogen generator shown in FIG. 8 further illustrating the electrical connections.

Referring to FIGS. 8-10, a hydrogen generator 20 is illustrated having outer contacts arranged on a single wall according to another embodiment. A plurality of contacts 144A-144H and 146A-146H are shown arranged on the same side of the housing 22A and 22B to allow for a plug-in electrical connection into the fuel cell system. In this embodiment, the fuel pellets 30 are shown as generally rectangular having electrical heating elements 32 extending therethrough as described in connection with the embodiments shown in FIGS. 2-5, except the electrical contacts 144A-144H on the top housing 22A connect to different rows of electrically conductive connectors 34A-34H such that the contacts 144A-144H may be on the same side of the housing as contacts 146A-146H. This allows a user to easily install the cartridge housing 22A and 22B such that the contacts 144A-144H and 146A-146H make electrical connection to circuitry on the same wall inside the fuel cell assembly and while allowing the hydrogen outlet port 26 to plug into the fuel cell stack at the same time. The contacts 144A-144H may include spring biased contacts that are formed on the inside surface of the upper housing member 22A and extend down so as to contact one of the pluralities of conductive strips 34A-34H. The bottom contacts 146A-146H may connect to conductive strips 36 or may be an integral piece that extends as part of the conductive strips 36.

Figure 11:
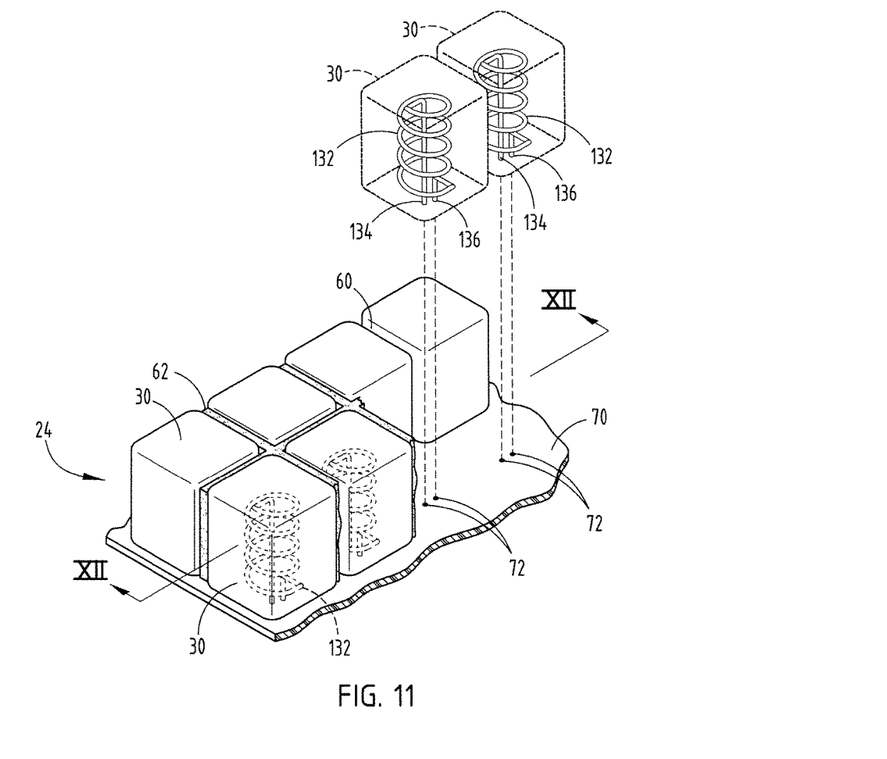
FIG. 11 is a partial exploded perspective view of a hydrogen generator having prismatic fuel pellets with helical heating elements and terminals connected to a circuit board, according to a further embodiment.
Figure 12:
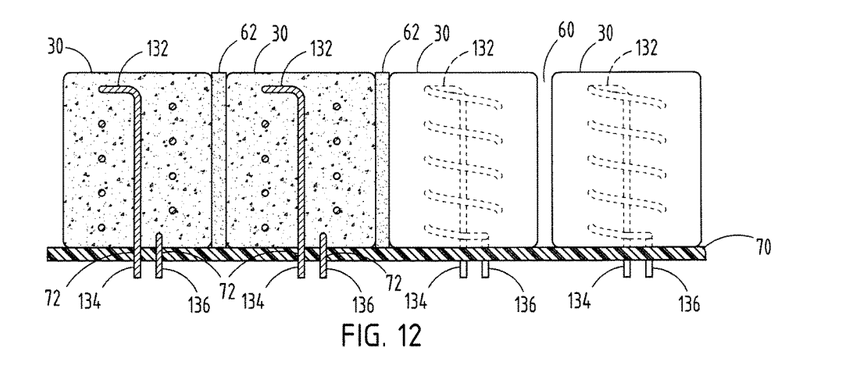
FIG. 12 is a cross-sectional view take through line XI-XI of FIG. 11.

Referring to FIGS. 11 and 12, a hydrogen generator 20 is illustrated employing a plurality of fuel pellets having alternative heating elements 132 in the shape of a coil that extends into the solid composition of the fuel pellet 30. In this embodiment, the heating element 132 has a pair of electrically conductive connectors 134 and 136 that extend from the same bottom side of the fuel pellet 30. Conductive connectors 134 and 136 serve as electrical contacts to provide electric current and also serve as support structures for plugging into receptacles 72 in circuit board 70. Circuit board 70 may have circuit traces that provide electrical connection to the electrical power source and ground. The fuel pellets 30 may be formed to include the heating element 32 having a curved portion shown as a generally helical shape extending through the solid composition. The connectors 134 and 136 extend from the bottom wall of the fuel pellet 30 and form structural terminals. Current may be applied to one of the connectors 134 and the other connector 136 may be coupled to ground selectively, so as to selectively apply power to one or more of the fuel pellets 30 at a time.

In operation, the hydrogen generator 20 may be disposed within a housing of a fuel cell system 10 and controlled such that one or more heating elements 32, 132 are activated to heat one or more fuel pellets 30 at a time. The hydrogen-containing reactant will release hydrogen gas when heated to a sufficient temperature, such as 160° Celsius to 200° Celsius. The controller 18 may control activation of one or more heating elements 32, 132 at a time so as to supply heat to one or more fuel pellets 30 which, in turn, heats the reactant provided thereon. When a fuel pellet 30 is heated, hydrogen gas is generated. A byproduct, such as ash, may remain within the cartridge housing 22A-22B, while hydrogen gas is allowed to pass through a gas flow path and exit the gas outlet 26 for supply to a hydrogen consuming device, such as a fuel cell 14. It should be appreciated that adjacent fuel pellets 30 may be heated at the same time, or remotely located pellets 30 may be heated at the same time so as to isolate the thermal heat generated within the housing.

Once the cartridge assembly 24 is fully consumed, a user may open the housing 22A-22B and remove the assembly 24 from the compartment and may replace the assembly 24 with a new assembly. In addition, the assembly 24 may be disassembled and the fuel pellets 30 and heating elements 32, 132 may be replaced with a fresh set of fuel pellets 30 and heating elements 32, 132. This may be achieved by disconnecting the cap ends of the heating elements 32 from the electrically conductive connectors 34, 36 and reassembling the electrically conductive connectors 34, 36 onto an array of fuel pellets 30 by connecting the connectors 34, 36 to the cap ends on top and bottom sides of the heating elements 32, or by removing the connectors 134, 136 from the circuit board receptacles 72 and plugging the connectors 134, 136 of fresh fuel pellets 30 into the receptacles 72 on the circuit board 70. The assembly 24 may then be reinstalled into the housing 22A-22B and the housing 22A-22B may be closed and the hydrogen generator 20 inserted into the fuel cell system housing 12.

The hydrogen generator 20 may be provided as a disposable hydrogen generator intended to be disposed of once the reactant has been consumed, according to one embodiment. According to another embodiment, the hydrogen generator 20 may reusable such that the byproduct may be removed from the housing and replaced with a fresh array of fuel pellets and heating elements.

Accordingly, the hydrogen generator 20 advantageously generates hydrogen gas for use by a hydrogen consuming device, such as a fuel cell or fuel cell stack. The hydrogen generator 20 provides for an easy to control reaction of reactants.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

The invention claimed is:

1. A hydrogen generator comprising:
   a housing;
   a plurality of fuel pellets disposed in the housing, each fuel pellet comprising a hydrogen-containing reactant that will react to release hydrogen gas when heated;
   a plurality of heating elements extending into the plurality of fuel pellets to generate heat to selectively heat one or more fuel pellets to initiate a reaction to produce hydrogen gas; and
   a plurality of electrically conductive connectors operatively coupled to the plurality of heating elements to selectively supply electrical power to the plurality of heating elements;
   wherein each of the plurality of heating elements comprises a heat generating rod extending through a fuel pellet and coupled at a first end to a first electrically conductive connector on a first side of the pellet and coupled at a second end to a second electrically conductive connector on a second side of the pellet for generating heat when electrical current is conducted on the rod;
   wherein each of the heat generating rods comprises a resistive heating element;
   wherein the heat generating rod extends entirely through the fuel pellet from the first side to the second side, wherein the first side is opposite the second side;
   wherein the plurality of connectors comprise a first array of electrical conducting strips coupled to the first ends of the rods on the first side of the fuel pellets and a second array of electrical conducting strips coupled to the second ends of the rods on the second side of the fuel pellets, wherein electrical current is controlled to transmit through selected fuel pellets by selecting one or more of each of the first and second arrays of electrical conducting strips.

2. The hydrogen generator of claim 1, wherein each of the first and second arrays of electrical conducting strips comprises a friction connector for engaging an end of the heater element.

3. The hydrogen generator of claim 1, wherein the heating elements are coupled to the electrically conductive connectors on the same side.

4. The hydrogen generator of claim 3, further comprising a circuit board having circuitry coupled to the electrically conductive connectors, wherein the fuel pellets are mounted onto the circuit board via the electrical contacts.

5. The hydrogen generator of claim 1, wherein the fuel pellet has a prismatic shape.

6. The hydrogen generator of claim 1, wherein the fuel pellet has a pyramid shape.

7. The hydrogen generator of claim 1, wherein each heating element comprises a carbon rod.

8. The hydrogen generator of claim 1 further comprising a space provided between adjacent fuel pellets.

9. The hydrogen generator of claim 8 further comprising a thermal insulation material disposed in the space between adjacent fuel pellets.

10. The hydrogen generator of claim 1 further comprising a hydrogen outlet coupled to the housing in fluid communication with each of the fuel pellets to provide a hydrogen outlet path.

11. The hydrogen generator of claim 1 further comprising:
    a controller for controlling activation of each of the plurality of heating elements to selectively heat one or more of the fuel pellets at a time.

12. The hydrogen generator of claim 1, wherein the hydrogen generator is adapted to be coupled to a fuel cell to supply hydrogen to the fuel cell.

13. The hydrogen generator of claim 1, wherein the first and second arrays of electrical connecting strips extend orthogonal to one another.

14. A fuel cell system comprising;
    a fuel cell comprising a hydrogen gas input; and
    a hydrogen generator comprising:
      a housing;
      a plurality of fuel pellets disposed in the housing, each fuel pellet comprising a hydrogen-containing reactant that will react to release hydrogen gas when heated;
      a plurality of heating elements extending into the plurality of fuel pellets to generate heat to selectively heat one or more fuel pellets to initiate a reaction to produce hydrogen gas;
      a plurality of electrically conductive connectors operatively coupled to the plurality of heating elements to selectively supply electrical power to the plurality of heating elements; and
      a hydrogen outlet coupled to the housing to provide a hydrogen outlet path to the hydrogen gas input of the fuel cell;
    wherein each of the plurality of heating elements comprises a heat generating rod extending through a fuel pellet and coupled at a first end to a first electrically conductive connector on a first side of the pellet and coupled at a second end to a second electrically conductive connector on a second side of the pellet for generating heat when electrical current is conducted on the rod;
    wherein each of the heat generating rods comprises a resistive heating element;
    wherein the heat generating rod extends entirely through the fuel pellet from the first side to the second side, wherein the first side is opposite the second side;
    wherein the plurality of connectors comprise a first array of electrical conducting strips coupled to the first ends of the rods on the first side of the fuel pellets and a second array of electrical conducting strips coupled to the second ends of the rods on the second side of the fuel pellets, wherein electrical current is controlled to transmit through selected fuel pellets by selecting one or more of each of the first and second arrays of electrical conducting strips.

15. The fuel cell system of claim 14, wherein the first and second arrays of electrical connecting strips extend orthogonal to one another.

* * * * *